April 16, 1935. M. CHEETHAM 1,998,270
TOY
Filed July 10, 1934
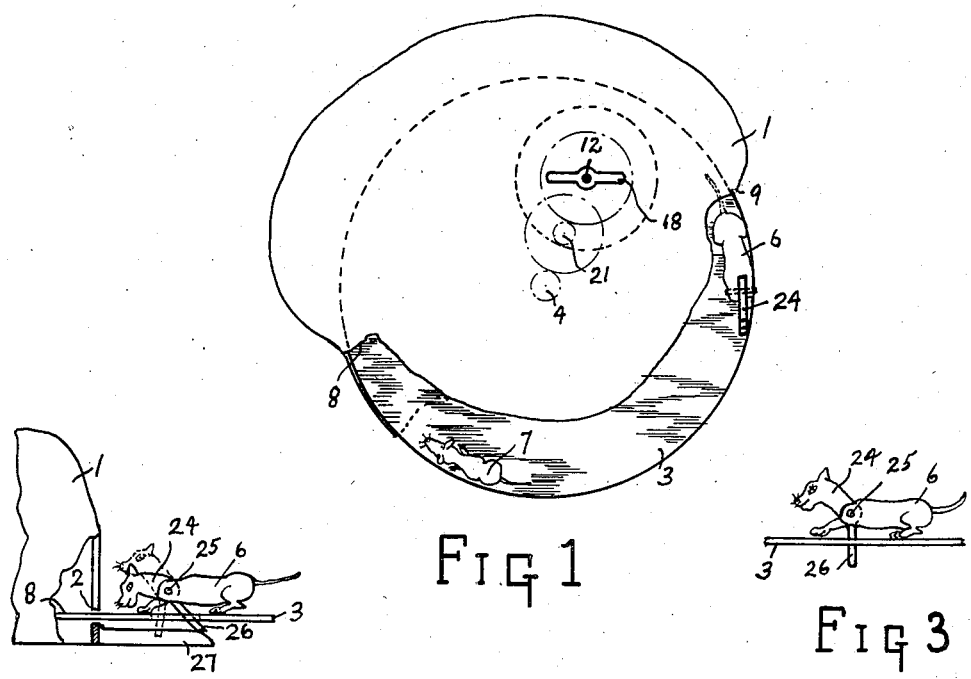
Fig 1
Fig 3
Fig 4
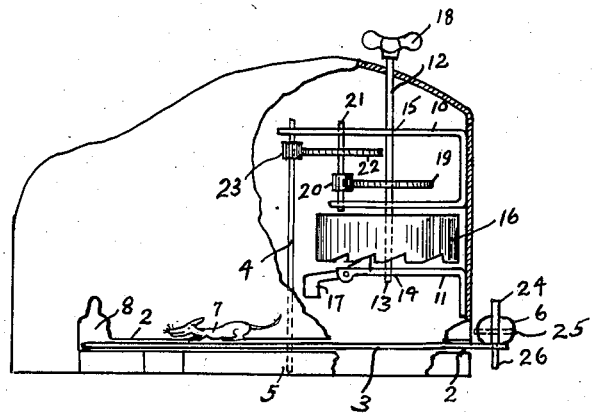
Fig 2
Margaret Cheetham
INVENTOR
BY *C. A. Harpman*
ATTORNEY Patented Apr. 16, 1935

1,998,270

UNITED STATES PATENT OFFICE 1,998,270

TOY

Margaret Cheetham, Youngstown, Ohio

Application July 10, 1934, Serial No. 734,542

4 Claims. (Cl. 46—40)

This invention relates to toys.

The principal object of this toy is to provide a mound having installed therein a horizontal rotating disk upon which is fastened a cat and a rat or any other suitable objects. The horizontal rotating disk is carried upon a shaft positioned without the center of the mound so that a portion of the disk is always outside of the mound. The mound has openings through which the rat pursued by the cat travel as the disk revolves.

A still further object is to provide means for movement of the cat's head when entering the opening in the mound when pursuing the rat.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a top plan view of the device.

Figure 2 is a front elevation of the device with parts broken away.

Figure 3 is a detail view of Figure 1 showing the cat with movable head up.

Figure 4 is a detail view of Figure 1 showing the cat with movable head down.

By referring to the drawing it will be seen that there is provided a mound 1. This mound 1 has a hollow interior and may be made of any suitable material but preferably of sheet metal.

By referring to the drawing it will be seen that the mound 1 is provided with a horizontal slot 2 near its base. In this horizontal slot 2 there is positioned a disk 3. This disk 3 is secured to a vertical revolving shaft 4, which is positioned without the center of the mound 1 at a point 5.

By referring to the Figure 1 it will be seen that the vertical revolving shaft 4 is centrally located in reference to the disk 3, yet due to the fact that the revolving vertical shaft 4 is not centrally located as to the mound, a portion of the disk extends beyond the horizontal slot 2 so that as the disk is caused to revolve a cat 6 is seen chasing a rat 7. It is understood that any other suitable objects may be used. This cat 6 and rat 7 are secured to the upper surface of the disk 3 near its outer circumference. It will also be seen that as the disk 3 revolves in a clock-wise direction the rat 7 pursued by the cat 6, will be carried into an opening 8 in the mound 1 and out through an exit opening 9 in the mound 1.

By referring to Figure 2 it will be seen that the vertical revolving shaft 4 is caused to revolve due to a geared movement comprising brackets 10 and 11. These brackets 10 and 11 carry a perpendicular shaft 12, the lower end 13 of which is journaled in an opening 14 of the bracket 11. It will also be seen that the perpendicular shaft 12 passes through an opening 15 in the bracket 10. This perpendicular shaft 12 has positioned near its base a spring contained ratchet drum member 16 functioning with a dog 17 in order that the spring may be held under tension. In winding the spring contained ratchet drum 16 the operator turns a thumb nut 18 positioned upon the perpendicular shaft 12 anti-clockwise. It will also be seen that the perpendicular shaft 12 carries a cog wheel 19 which meshes with a smaller cog wheel 20 positioned upon a shaft 21. This shaft 21 carries a cog wheel 22 which meshes with a cog wheel 23. This cog wheel 23 is positioned upon the revolving vertical shaft 4.

In order that the cat 6 may go into the opening 8 and in order to produce motion the head 24 of the cat 6 is pivoted to the body of the cat 6 by means of a pivot 25. It will also be seen that the head 24 has a downturned weighted member 26 which normally holds the cat's head 24 in an upright position. When this downturned weighted member 26 comes in contact with a lug 27 positioned directly in front of the opening 8 the cat's head 24 will be caused to swing downwardly as it enters the opening.

What I claim is:—

1. In a device of the class described, a hollow mound, openings in said mound, a revolving vertical shaft positioned without the center of said mound, a disk secured to said revolving vertical shaft, a cat and rat secured to said disk, a cat's head pivoted to the body of said cat, a weighted down-turned arm member secured to said cat's head, means for causing the cat's head to be lowered when entering the opening in said mound, means for causing said vertical shaft and said disk to revolve.

2. In a device of the class described, a hollow mound, openings in said mound, a revolving vertical shaft positioned without the center of said mound, a disk secured to said revolving vertical shaft, a cat and rat secured to said disk, a cat's head pivoted to the body of said cat, a weighted down-turned arm member secured to said cat's head, means for causing the cat's head to be lowered when entering the opening in said mound, clockwork means for causing said vertical shaft and said disk to revolve.

3. In a device of the class described, a hollow mound, openings in said mound, a horizontal slot member formed in said mound near its base, a revolving vertical shaft positioned without the center of said mound, a disk centrally secured to said revolving vertical shaft and positioned in said slot, a cat and rat secured to said disk, a cat's head pivoted to the body of said cat, a weighted down-turned arm member secured to said cat's head, means for causing the cat's head to be lowered when entering the opening in said mound, clockwork means for causing said vertical shaft and said disk to revolve.

4. In a device of the class described, a hollow mound, openings in said mound, a horizontal slot member formed in said mound near its base, a revolving vertical shaft positioned without the center of said mound, a disk centrally secured to said revolving vertical shaft and positioned in said slot, objects secured to said disk, a head pivoted to the body of the object, a weighted down-turned arm member secured to said head, means for causing said head to be lowered when entering the opening in said mound, clockwork means for causing said vertical shaft and said disk to revolve.

MARGARET CHEETHAM.